Patented Oct. 24, 1944

2,360,988

UNITED STATES PATENT OFFICE 2,360,988

UNDERCARRIAGE LEG FOR AIRCRAFT

Albert Henry James Thomas, Carshalton Beeches, England, assignor to Rollason Aircraft Instruments and Equipment Limited, Purley, England, a joint-stock company of limited liability, of England Application June 10, 1941, Serial No. 397,485
In Great Britain July 3, 1940

22 Claims. (Cl. 244—102)

This invention relates to undercarriages for aircraft (including seaplanes) and in particular to wheel (and/or float) supporting legs therefor.

The invention has for an object to provide improved retractable undercarriage legs in which hydraulic means may serve to effect retraction and extension and also to damp wheel or float movements when landing or taxiing.

An undercarriage leg according to the invention comprises the combination of a telescopic member and a radius member pivoted about spaced parallel axes to the airframe with means for connecting the outer end of the radius member alternatively to the anchored and to the movable parts respectively of the telescopic member.

According to a feature of the invention an undercarriage leg mounted for pivotal retracting and lowering movement and comprising a telescopic member, one part of which is pivoted and the other part of which is movable longitudinally relatively to the first when in the lowered position, has means for positively effecting such relative movement.

Preferably hydraulic means are provided for shortening and/or lengthening the telescopic member.

Preferably also, the telescopic member, the movable part of which is free to float when the radius member is connected to the anchored part, includes oleo-pneumatic means for damping and resiliently resisting external loads (applied endways of the movable part).

For shortening and/or lengthening the telescopic member, means may be provided for applying boost pressure from an external source to a piston carried by the movable part of the telescopic member and sliding within the anchored part thereof, either a closed, or an open, circuit liquid pressure system being employed.

In general, the telescopic member will as a whole constitute the leg proper, and the anchored or cylinder part thereof may be in communication with a reservoir or air accumulator for pressure liquid so that liquid displaced upon shortening of the telescopic leg due to consequent reduction of liquid space within the cylinder will pass to this accumulator and so build up pressure therein, whilst upon lengthening of the telescopic leg liquid may pass from the accumulator to compensate for consequent increase of liquid space within the cylinder in the case of a closed circuit arrangement. In the case of open circuit working means may be provided whereby, upon the attainment of a predetermined pressure in the accumulator during shortening the connection of the cylinder to the accumulator is automatically by-passed to the exhaust side of the system.

A passage to the accumulator from the cylinder may have a restriction, there being little or no resistance to the flow of liquid from one side of the piston to the other. This restriction may be adjustable automatically upon change in length of the telescopic member so that the more the latter is shortened the greater is the resistance to flow of liquid therethrough to the accumulator.

Further, such restricted passage may be by-passed by an outlet controlled by a non-return valve so that there will be little or no resistance to flow of liquid from the accumulator and so to the lengthening of the telescopic member.

In such case the air accumulator may have three connections with the control valve: one a direct connection closed or opened by said valve, the second an outlet controlled by a non-return valve and the third by way of an adjustable restriction valve; the control valve setting for lengthening, or tending to lengthen, the telescopic member being such as to close the direct connection and leave the restriction valve connection open so that shortening movement of the telescopic member under load will be resisted by the restriction of liquid flow thereto via the restriction valve, as well as by consequent increase of pressure in the air accumulator, whereas lengthening movement of the telescopic member will not be so hindered owing to the comparative ease with which liquid may leave the accumulator under the pressure therein via the non-return valve outlet. Such provision will tend effectively to maintain contact of a landing wheel with the ground should the aircraft lift slightly during landing or taxiing.

It is desirable that provision should be made whereby the same valve may be set to connect the boost pump for lengthening the telescopic member. In the case of closed circuit working, when the valve is set for lengthening the telescopic member, the pump delivery is connected to the cylinder above the piston and the pump return is connected not only to the cylinder below the piston but also to the accumulator so that the supply of liquid at the return side of the pump may be maintained from the accumulator, despite the increase of liquid space within the cylinder.

Such air-accumulator with or without the control valve is preferably carried by the cylinder part of the telescopic member.

According to a feature of the invention a catch device for connecting the outer end of the radius member alternatively with the anchored and with the movable parts respectively of the telescopic member comprises a lug on the radius member having oppositely directed notches for engagement with transverse engagement projections or the like on said parts, respectively, of the telescopic member, a substantially E-shaped latch member pivoted about the end of this centre limb on the lug at a point between said notches for angular movement in the one direction to a position in which one outer limb thereof extends across one notch to retain the corresponding engagement projection therein and the other limb is withdrawn clear of the other notch, and for angular movement in the opposite direction to close the latter notch and open the first. The latch member is preferably spring-influenced to tend always to assume a position in which it closes one of the two notches in the lug, detent means being provided for holding the latch member against the spring-influence in position to close the other notch of the lug.

The invention is illustrated by the accompanying diagrammatic drawings, of which:

Figs. 3 to 9 are fragmentary views drawn to a larger scale illustrating a catch device whereby the radius member is connected for landing with the anchored part and for retraction with the moving part of the telescopic member, Fig. 3 being a part sectional elevation of this catch fully engaged with the anchored part, Figs. 4 and 5 showing the catch at early stages in the retracting, or late stages in the lowering, movement of the leg, Fig. 6 showing the catch fully engaged with the moving part of the telescopic member, Fig. 7 being a section on the line 7—7 of Fig. 3, the catch device being omitted, and Fig. 8 a view of the catch as seen from the left hand side of Fig. 3, whilst

Figure 10:
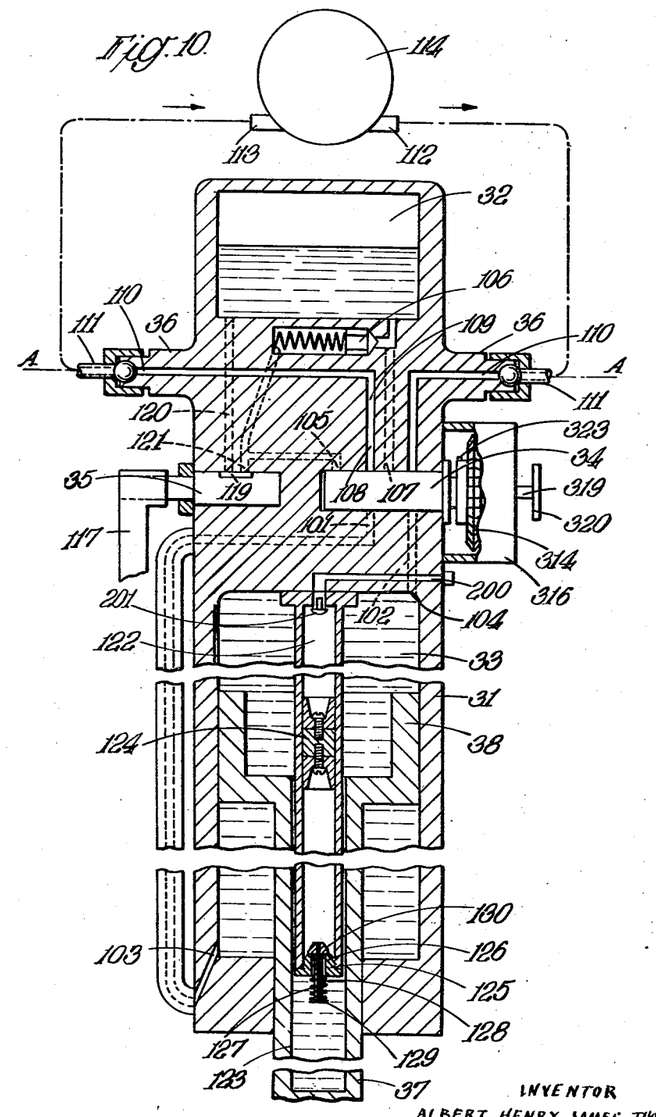
Fig. 10 shows in sectional elevation, also to a larger scale, the essential features of a telescopic member and the means for connecting it for lengthening and shortening movement with a closed circuit liquid pressure system, Figs. 11, 12, 13 and 14 being developments of the obturating surface of a control valve indicating the modifications to connections for pressure liquid effected thereof at four different settings.
Figure 15:
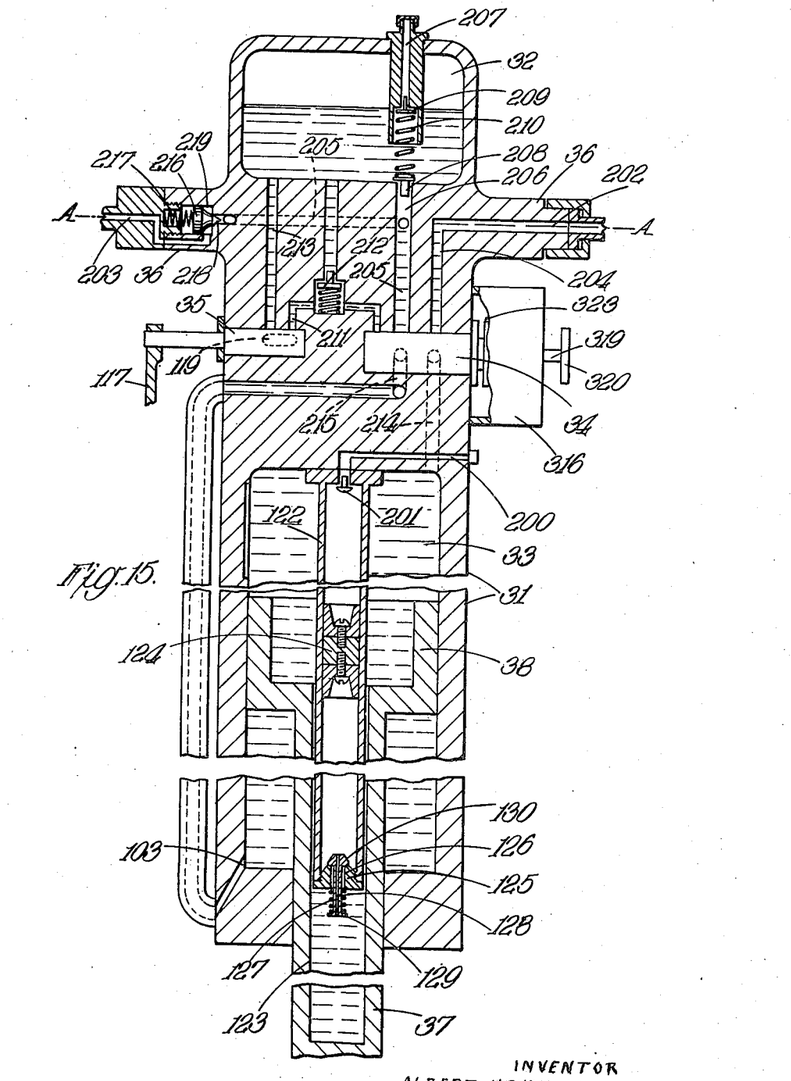
Fig. 15 is a view similar to Fig. 10 of a telescopic member for operation from an open liquid pressure system, Figs. 16, 17, 18 and 19 being views similar to Figs. 11, 12, 13 and 14 of the obturating surface of the control valve thereof.

In the drawings, the anchored cylinder part of the telescopic member, or leg proper is indicated generally at 31, a reservoir or air accumulator for pressure liquid at the top thereof at 32, and an hydraulic cylinder therein at 33, see Figs. 10 and 15. Between the reservoir 32 and the cylinder 33 the anchored part 31 of the leg is formed with passages to be described below for pressure fluid which are controlled by a rotary control valve 34 and an automatically adjusted rotary restriction valve 35. The anchored part 31 is intended to be pivoted about an axis indicated at A—A to an airframe (not shown) for which purpose it is provided with trunnions 36. The movable part of the telescopic member is in the form of a ram 37 extending liquid-tight through the lower end of the anchored part 31 and which carries at its upper end a piston 38 (Figs. 10 and 15) slidable in said cylinder 33.

Figure 1:
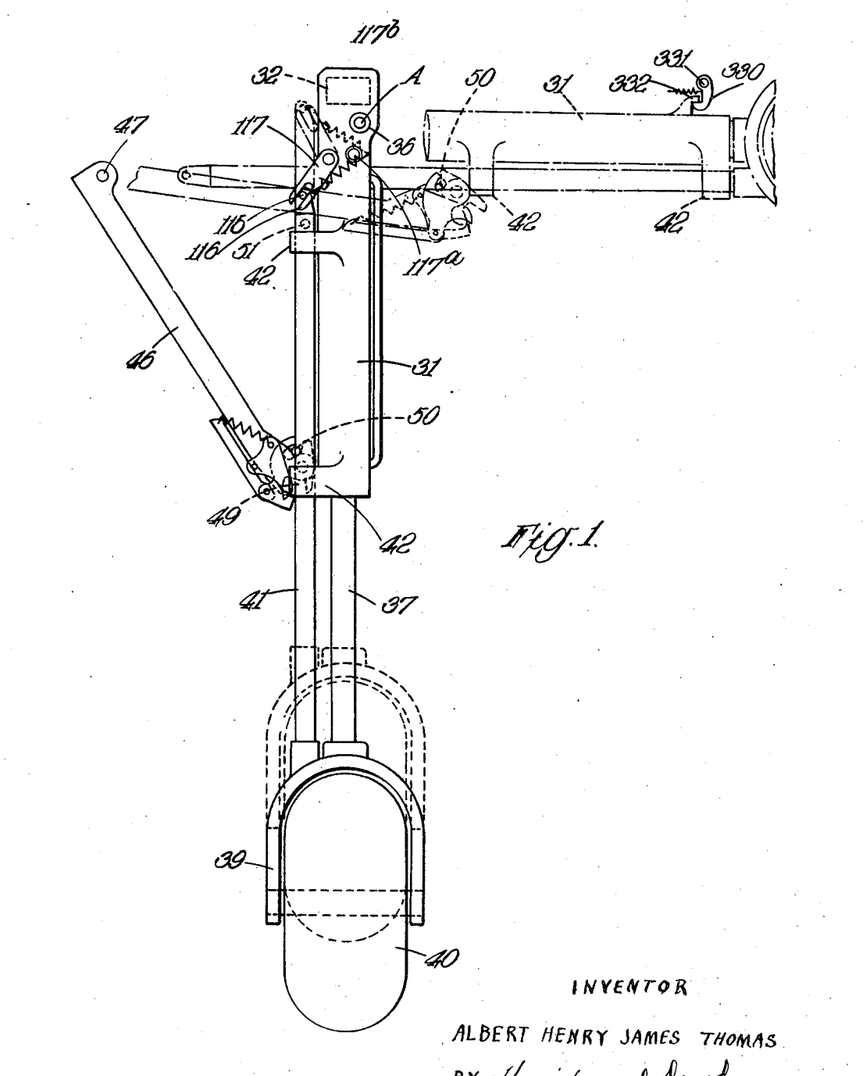
Figs. 1 and 2 are general views of an undercarriage leg as lowered in front and side elevation, Fig. 1 also indicating in broken lines the retracted position of the leg.
Figure 2:
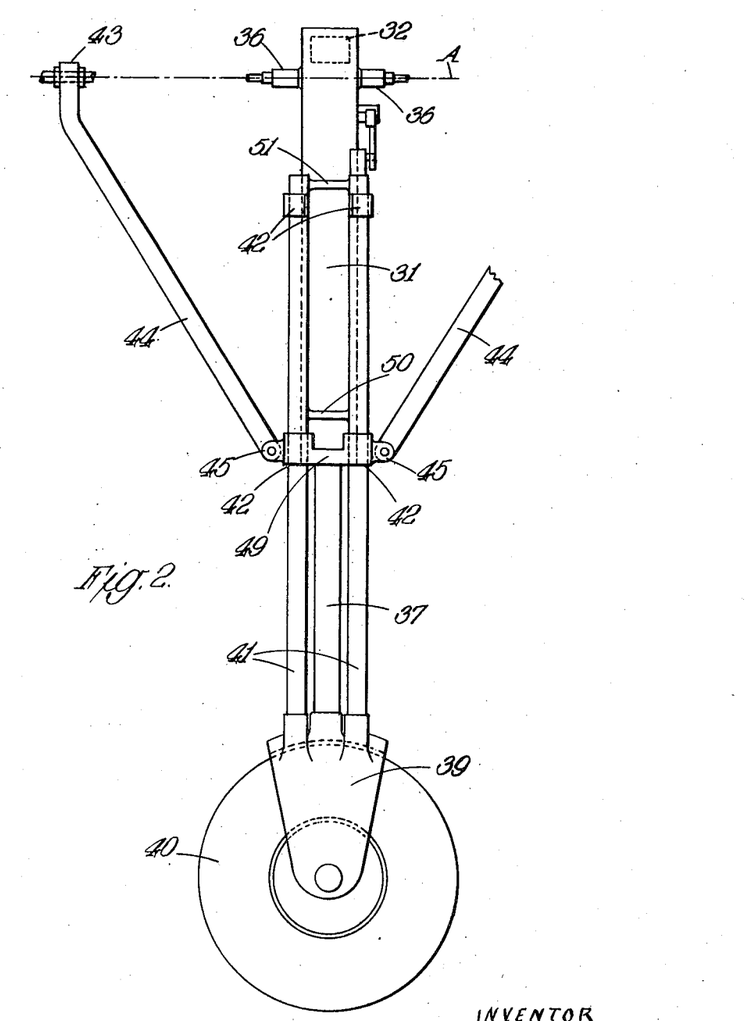

At its lower end the ram 37 is attached rigidly to a mounting 39 for a wheel 40 from which there extend upwardly alongside the ram 37 and cylinder part 31 two rods 41, joined by bridge pins 50 and 51, and which are slidable in guides 42 carried by the cylinder part 31 externally thereof. The upper guides 42 for the rods 41 are gaped (see Fig. 2) to give passage to the pin 50 as it moves between the full line and broken line positions of Fig. 1. In addition to affording part of the necessary strength and stiffness of the leg as a whole these slide rods 41 serve to prevent twisting of the wheel 40 or at least of the wheel 39 mounting about the axis of the ram 37 and cylinder part 31. For supporting the leg against any tendency to movement in a plane containing its pivotal axis A—A there extend from pivots, one of which is indicated at 43 Fig. 2, coaxial with the main leg pivot and spaced at opposite sides of the leg respectively, two rigid struts 44 (Fig. 2) which are attached to lugs 45 formed on the cylinder part 31 at its lower end.

Further, a rigid radius member 46 (Fig. 1) is pivotally attached at its upper end to the airframe (not shown) at a point 47 slightly below the level of the axis A—A of the main leg pivot and to one side thereof. A catch device is provided whereby the lower end of this radius member 46 is attached to the lower end of the cylinder part 31 when the leg is lowered for use and is detached from the lower end of the cylinder part 31 and attached to the slide rods 41 of the lower telescopic part 37 of the leg when the latter is out of the lowered position, so that shortening and lengthening of the telescopic leg will cause upward (retracting) and downward (lowering) swinging of the leg about its pivotal attachment to the airframe at that side remote from the radius member 46.

This catch device will now be described.

As shown particularly in Figs. 3 to 9 of the drawings, a lug 48 on the lower end of the radius rod 46 projects laterally therefrom towards the leg, above a substantially rectangular section bridge piece 49 linking the slide rod guides 42 at the lower end of the cylinder part 31, and below the lower bridge pin 50 which is of circular cross-section. (At their upper ends the slide rods 41 are united at a second circular section bridge pin 51.) The lug 48 is formed at its underside with a deep square notch 52 to fit closely over, or to receive, the bridge piece 49 and at its upper side with a rounded V-shaped notch 53 to cooperate with the bridge pin 50. When the leg is lowered for use and is supporting its share of the weight of an aircraft the slide rod bridge pin 50, owing to the then raised position of the ram 37 in relation to the cylinder part 31, is located some distance above the upper notch 53 of the lug 48 and the lower notch 52 of said lug embraces the bridge piece 49 at the top and inner and outer side faces of the latter (see Fig. 3), said side faces converging slightly towards one another towards the top face to ensure a firm engagement. For holding the lug 48 in such firm engagement with the bridge piece 49 and therefore with the cylinder part 31, or in pivotal engagement with the slide rod bridge pin 50 and therefore with the slide rods 41, as required, the lug 48 is bifurcated (see Fig. 8) and there is mounted thereon between the bifurcations thereof for movement about a pivot 55 a substantially E-shaped latch member 54.

When the leg is taking part of the weight of an aircraft as just mentioned the lug 48 is held tightly with its lower notch 52 embracing the bridge piece 49 by the bottom limb 57 of the latch member 54 which is then rocked by spring-influence about its pivotal mounting on the lug 48 to, and held in, a position in which it extends across and in contact with the bottom face of the bridge piece 49. As shown said bottom face and the cooperating surface of the bottom limb 57 are shaped to ensure a wedging action and thus a rigid connection between the bridge piece 49 and the lug 48. When the latch member 54 is in this position the free end of its upper limb 56 lies substantially clear of the upper notch 53 of the lug 48.

Upon the aircraft becoming airborne, the resulting downward movement of the ram 37 (under pressure from the accumulator 32 acting on the upper face of the piston 38 and under the influence of gravity) is terminated by the engagement of the slide rod bridge pin 50 in the upper notch 53 of the lug 48. When it is desired to retract the leg the latch member 54 is rocked about its pivot 55 on the lug 48 against spring influence as will be explained below by means of a Bowden wire 58 until the end of its bottom limb 57 all but clears that edge remote from the leg, of the shaped bottom face of the bridge piece 49 and the upper limb 56 of the latch member 54 extends over the top of the bridge pin 50, see Fig. 4. After the latch member 54 has been shifted in this way shortening movement of the leg commences and the consequent upward movement of the slide rods 41 with the lug 48 and latch member 54 causes the end of the bottom limb of the latter to ride cam-fashion over the edge of the bottom face of the bridge piece 49 to the outer face thereof, i. e., that side face remote from the leg, thus rocking the latch member 54 so that its top limb 56 extends further across the top of the slide rod bridge pin 50.

The purpose of this additional rocking of the latch member 54 is to initiate an operation whereby said member 54 is locked or held in position during retraction until the leg is again lowered for use. At a point 59 remote from the pivotal mounting 55 of the latch member 54 on the lug 48 and on the side of said mounting 55 remote from the leg there is pivotally attached to the latch member 54 the lower end of a detent 60 which extends upwardly alongside the radius member 46 and has at its upper end an undercut nib 61 adapted to engage a correspondingly undercut lip 62 of an opening 63 in the radius member 46. Further, a double rocker comprising two like parts 64 one at each side of the radius member 46 and which are united by a cross-bar 67 is attached pivotally to the radius member 46 by coaxial pivots 65. This double rocker 64 cooperates through the medium of the cross bar 67 with the detent 60 intermediately of the length of the latter, and at their free ends the two parts 64 of the rocker are adapted to cooperate with cam surfaces 68 extending upwardly from the ends of the bridge piece 49, to hold the rocker 64 in a position (see Figs. 3 and 4) in which it, in turn, holds the detent 60 outwardly clear of the radius member 46. When clear of said cam surfaces 68 said rocker 64 allows the detent 60 to move inwardly towards the radius member 46. At its upper end the detent 60 carries a cross bar 69 by means of which there are connected thereto the upper ends of coiled tension springs 70 the lower ends of which are attached at points 71 to the two parts 64, respectively, of the double rocker. Under the influence of these springs 70 the rocker 64 tends at all times to move in an anti-clockwise direction about its pivot 65 and the detent 60 tends at all times to move about its pivot 59 towards the radius member 46 and, further, the springs act on the E-shaped latch member 54 through the intermediary of the detent 60 to cause said latch member 54 to tend always to rock about its pivotal mounting 55 in an anti-clockwise direction.

Figures 3, 4, 5, 6:
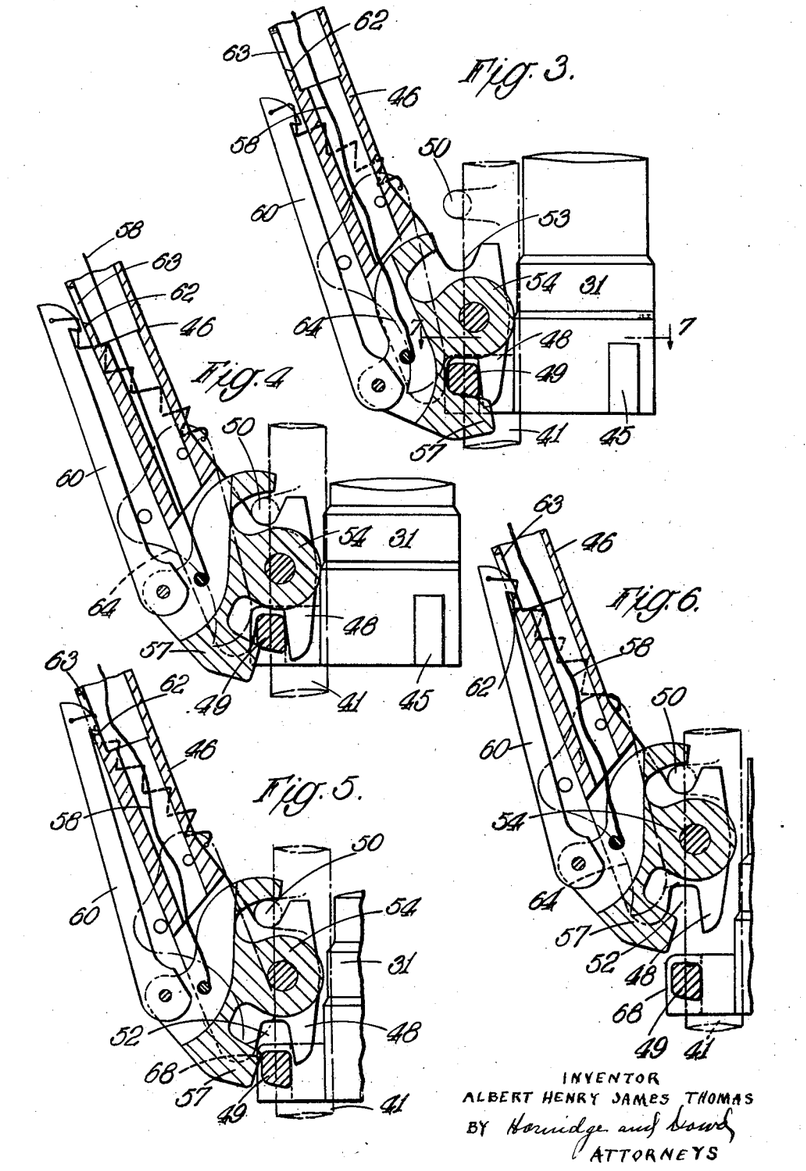
Figure 7:
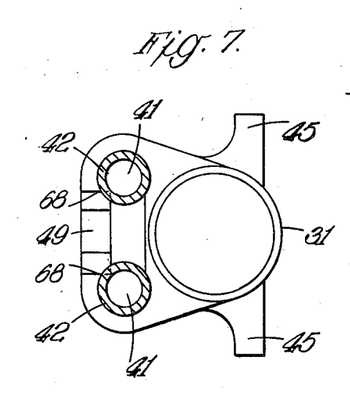
Figure 8:
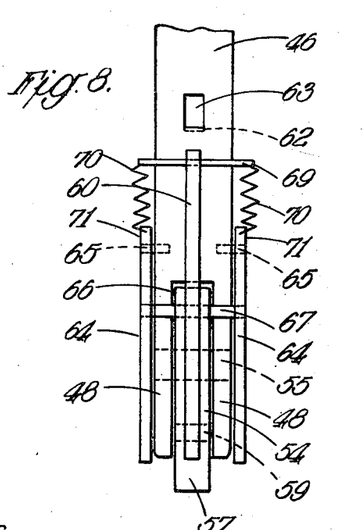
Figure 9:
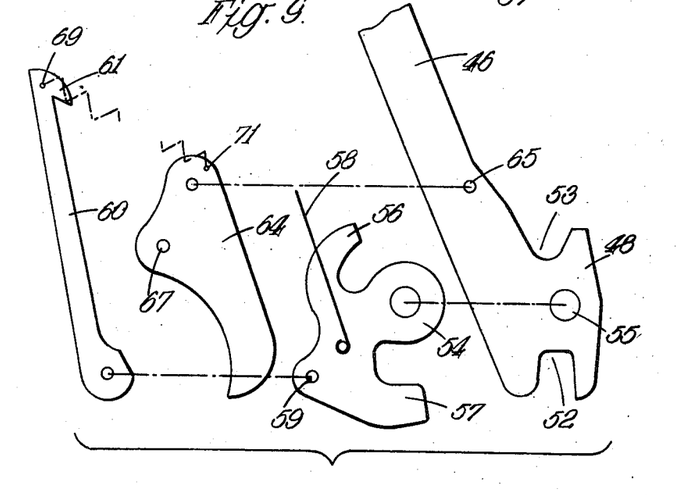
Fig. 9 shows the several parts of the catch separated from one another.

The initial movement of the latch member 54 to the position shown in Fig. 4 raises the detent 60 some distance alongside the radius member 46 and the additional rocking movement imparted to the latch member 54 by its bottom limb 57 arriving in the outer face of the bridge piece 49 raises the detent further and brings the nib 61 of the detent opposite the opening 63 in the radius member 46. Then, as the shortening of the leg continues, first the rocker 64 rides clear of the cam surface 68 as a result of which both the rocker 64 and the detent 60 move inwardly under the influence of the springs 70 and the nib 61 is thus located in the opening 63 (Fig. 5) and second, the bottom limb 57 of the latch member 54 rides clear of said surfaces, whereupon as a result of the spring-influence the detent 60 moves downwardly until the undercut nib 61 thereof engages the undercut lip 62 of the opening 63 and in so doing moves the latch member 54 slightly in the reverse direction (Fig. 6). This is the operation whereby the latch member 54 is locked or held in position during retraction and until the leg is again lowered for use.

When the leg is subsequently lowered for use a reverse, unlocking, operation takes place. First the bottom limb 57 of the latch member 54 engages the outer face of the bridge piece 49 thus raising the detent until the nib 61 is clear of the lip 62 (see Fig. 5). Then the rocker 64 engages the cam surfaces 68 and shifts the detent 60 outwardly and holds it there. Next, as the shortening of the leg continues, the detent 60 and latch member 54 move under the spring-influence first to the position shown in Fig. 4 and then to the position shown in Fig. 3 in which the radius member 46 is rigidly secured once again to the cylinder part 31 of the leg.

To deal now with the hydraulic means for effecting shortening or lengthening of the telescopic member by which the leg proper is comprised and taking the case of a leg intended for use with a closed circuit liquid pressure system as illustrated in Figs. 10 to 14:

A cylindrical chamber in which the control valve 34 is rotatable has two ports 101 and 102 connected respectively at 103 with the lower part of the cylinder 33 below the piston 38 and at 104 with the upper part of the cylinder 33 above the piston 38; a third port 105 of said valve chamber is connected on the one hand via the adjustable restriction valve 35 and on the other hand via a non-return outlet valve 106 with the air accumulator 32, a fourth port 107 of said chamber communicates directly with the accumulator 32, and fifth and sixth ports, respectively 108 and 109, of said valve chamber communicate respectively, via passages 110 and conduits 111 disposed coaxially of the main leg pivot axis with the delivery and return sides 112 and 113 of an external pump 114 for pressure liquid. Control means, fully described below and indicated generally at 316 (Fig. 10) are provided for rotating the valve 34 to afford the various different hydraulic connections required in the operation of the leg and the adjustable restriction valve 35 is controlled automatically according to the extent to which the two main parts 31 and 37 are telescoped so that the higher the piston 38 moves the greater is the resistance to further liquid via the restriction valve 35 to the accumulator 32.

For this purpose the restriction valve is connected for rotation with shortening or lengthening of the leg (see Fig. 1) with the slide rods 41 by means of a pin 115 on one slide rod 41 engaging an open-ended slot 116 in the end of a crank arm 117 fast on said valve 35, a coil tension spring 117a holding the crank arm 117 against a stop 117b when the pin 115 rides clear of the slot 116 during shortening movement of the leg. The valve 35 is completely closed when the arm 117 is against the stop 117b.

The restriction valve 35 is of simple type, the cylindrical body thereof being formed intermediately of its length with a flat 119 which when said valve is not fully closed is in register with the open ends of passages 120 and 121 communicating respectively with the accumulator 32 and the control valve passage 105. The whole of the hydraulic system is maintained at all times fully charged with pressure liquid by pressure from the air accumulator 32.

For landing and taxiing, which require that the wheel movements should be damped by the hydraulic system, the control valve 35 is set to the position (shown in Fig. 11) in which the connections afforded thereby are such that air pressure in the accumulator 32 tends to lengthen the leg and so to resist end loading thereof. In Figs. 11 to 14 of the drawings the outline of the cylindrical surface of the valve 34 and grooves formed in this surface are indicated in full lines, passages formed within the body of the valve 34 are indicated in chain lines, and the open ends of the ports in the valve chamber are indicated in broken lines. When the valve 34 is set to the position shown in Fig. 11 the passages 101 and 102 leading, respectively, to the cylinder 33 below and above the piston 38 and the passage 105 leading to the restriction valve 35 and the non-return valve 106 are interconnected by groove 118, and the direct connection 107, to the accumulator 32 is closed, as are also the pump return and pump delivery connections 108 and 109 respectively.

There is no appreciable restraint, other than the limitation of liquid flow by the dimensions of the various passages, to the transfer of liquid from above the piston 38 to below the piston, but during upward movement of the wheel 40 and therefore of the ram 37 and piston 38 the liquid volume of the cylinder 33 will be reduced by the inclusion of a greater length of the ram 37 within the cylinder 33 and the liquid thus displaced will pass via the restriction valve 35 to the accumulator 32. The upward movement of the wheel 40 and ram 37 will be retarded by the increasing resistance offered by the restriction valve 35 to the passage of liquid as the leg shortens and by increase of pressure within the accumulator 32 further compressing the air in the latter. Downward movement of the wheel 40 and piston 38, for example, if and when an aircraft lifts momentarily, will not be damped by the restriction valve 35, for the liquid will flow substantially freely from the accumulator 32 assisted by the air pressure therein, via the non-return valve 106, passage 105, control valve 34 and passage 102 to the cylinder 33 above the piston 38.

Further resilient resistance to upward wheel movement is afforded by the provision of a high pressure air cylinder 122 disposed coaxially within the cylinder 33 and which is secured at its closed upper end to the upper end of said cylinder 33. This high pressure cylinder 122 extends downwardly into a coaxial bore 123 of slightly larger diameter formed in the piston 38 and ram 37.

A floating piston 124 within the high pressure cylinder 122 seals off high pressure compressed air contained in said cylinder 122 above said piston 124, a connection 200 controlled by a non-return valve 201 being provided for introducing compressed air into the cylinder 122. The lower end of said cylinder 122 is closed by a screw plug 125 formed with a bore 126 within which is slidable loosely under the influence of a coiled compression spring 127 a valve 128, which latter in turn is formed with a small diameter bore extending from end to end thereof. The spring 127 acts by bearing at one end on the outer face of the plug 125 and at the other upon a flange 129 at the outer end of the valve 128 to tend to maintain the lower face of a head 130 formed at the inner end of the valve against the inner face of the plug 125. Except when the liquid pressure in the cylinder 33 exceeds a predetermined value greater than the air pressure in the cylinder 122, the floating piston 124 seats around the valve head 130 upon the inner face of the plug 125. When, however, the pressure in the cylinder 33 exceeds this value pressure liquid from the cylinder 33 will enter the cylinder 122 below the piston 124 by way of the bore in the valve 128 and if the increase of pressure be sudden will lift the valve 128 and enter also by way of the bore 126 in the plug 125 and will raise the piston 124 by an amount according to the increase in pressure. In general, the design will be such that under normal static loading, i. e., when the leg is supporting its share of the weight of an aircraft stationary on the ground, the restriction valve 35 will be closed and the piston 124 will be raised somewhat from the lower end of the cylinder 122 and upon any increase of the loading of the leg the floating piston 124 will be raised further and the leg will shorten correspondingly.

It will be understood that the air pressure in the cylinder 122 will, even under no load conditions be considerably higher than the maximum pressure that obtains in the accumulator 32. It will be seen that during landing or taxiing continued upward movement of the ram 37 will displace liquid from above to below the piston 38 and from the cylinder 33 as a whole to the accumulator 32, and further that air pressure in the air cylinder 122 may in the event of reduction in the loading of the leg depress the piston 124 and displace liquid from the lower part of the cylinder 122 through the bore in the valve 128 via the annular space around the cylinder 122 to above the piston 38 and thence to the accumulator 32. As, however, this bore in the valve 128 affords only a restricted outlet from the cylinder 122 it is ensured that in the event of the aircraft lifting momentarily during taxiing no violent extension or rebound movement can take place. On the other hand, the relatively free outlet via the non-return valve 106 from the accumulator 32 to the cylinder 33 cannot, owing to the relatively low pressure in the accumulator 32 cause any violent wheel movement but will, on the contrary, serve to maintain contact between the wheel 40 and the ground. The high pressure air cylinder 122 and piston 124 afford a resilient abutment, so to speak, which is damped as regards recoil, to the damping afforded by the main cylinder 33 and ram 37, the automatically adjusted restriction valve 35 and the air accumulator 32.

To deal now with retraction. This is effected by shortening the leg by means of the pump 114 the radius member 46 being disconnected from the cylinder 31 and attached pivotally to the slide rods 41 at the bridge pin 50 in the manner explained above. Owing to the position of the pivots A and 47 (Fig. 1) shortening of the leg results in upward swinging movement of the leg as is required for retraction. The shortening movement of the leg is effected by setting the control valve 34 to the position shown in Fig. 12 whereby the pump delivery passage 109 is connected via a groove 130 with the passage 101 leading to the cylinder 33 below the piston 38, the passage 102 from the cylinder 33 above the piston 38 is connected with the direct connection 107 to the accumulator 32 and also with the pump return passage 108 via the inter-connecting passages 132, 133, 134 and 135 within the body of the control valve 34, and the passage 105 leading to the restriction valve 35 and the non-return valve 106 is closed. The pump 114 being operative, pressure liquid therefrom raises the piston 38 and liquid displaced from the cylinder 33 as a whole is transferred via the control valve 34 to the accumulator 32 and some of this liquid passes via non-return valve 106 from the accumulator 32 to the return side 113 of the pump 114. Owing, however, to the displacement of liquid from the cylinder 33 increased pressure is built up in the accumulator 32 and will be maintained there so long as the leg is in its fully retracted position in which it is retained by an automatic holding catch 330 described below. When the leg is fully retracted the control valve 34 may be set to the position shown in Fig. 13 in which all the passages controlled thereby are closed.

Two methods are afforded for lengthening the telescopic leg to effect lowering thereof for landing, namely, the "normal lowering" method which utilises the air pressure built up in the accumulator 32 during the previous retraction of the leg for lengthening the latter, and "emergency lowering" by which pressure from the pump 114 is used to effect the necessary lengthening of the leg.

Figure 11:
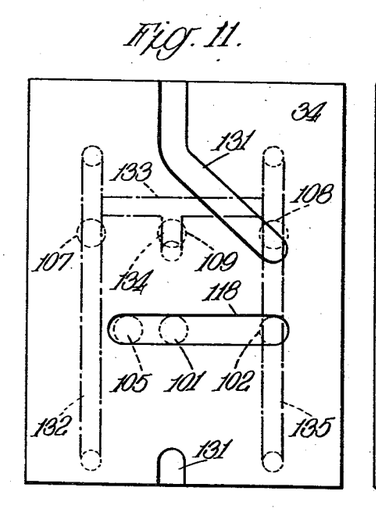

For normal lowering the control valve 34 is set to the position of Fig. 11, discussed above, as for landing and taxiing when, the holding catch 330 being released, the pressure in the accumulator 32 causes the return of liquid therefrom to the cylinder 33 as a whole, and, as the area of the piston 38 at which the pressure fluid can act at the upper side thereof is greater than the area at the underside of the piston 38 the latter moves downwardly, thus lengthening the leg and lowering it to position for use. Means for releasing the holding catch 330 are described below.

It may in some cases be preferred to set the valve 34 to the landing or taxiing position of Fig. 11 when the leg is fully retracted so that extension would commence automatically immediately the holding device 330 was released. When the leg arrives in the fully lowered position the lower end of the radius member 46 is once again attached to the lower end of the cylinder part 31 in the manner described above.

If for any reason the pressure in the accumulator 32 should be insufficient to effect the lowering operation, then lowering is effected by the emergency method. For emergency lowering the control valve 34 is set to the position indicated in Fig. 14 whereby the pump delivery port 109 is connected with the port 102 leading to the cylinder 33 above the piston 38, the port 101 communicating with the cylinder 33 below the piston 38 is connected with the port 108 leading to the pump return and to the port 107 connected directly with the accumulator 32, whilst the port 105 leading to the restriction valve 35 and the non-return valve 106 is closed. Then upon operation of the pump 114, pressure liquid therefrom shifts the piston 38 downwardly, liquid from the accumulator 32 via the non-return valve 106 maintaining an adequate supply of liquid at the return side of the pump to compensate for the increase in volume of the cylinder 33 above the piston 38, which is greater than the accompanying decrease in volume of the cylinder 33 below the piston 38.

Consideration will show that the four settings of the valve 34, shown in Figs. 11, 12, 13 and 14 respectively, serve fundamentally to effect pressure liquid connections with the following results:

For the Fig. 11 setting the accumulator pressure tends to lengthen the telescopic leg. This setting is therefore of service as explained for taxiing and for normal lowering of the leg.

Figure 12:
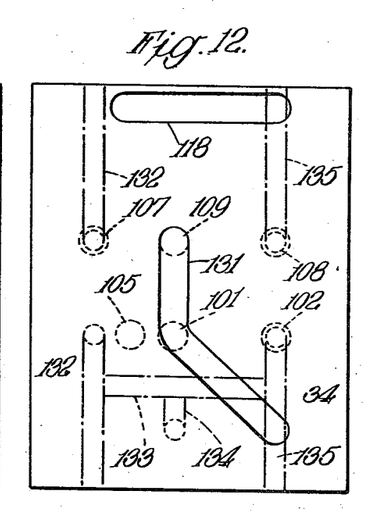

For Fig. 12 pressure liquid from the pump shortens the leg so that this setting is of service for effecting retraction but may be used, for example, to lower an airframe in relation to the landing wheels, or floats. Such lowering of the airframe may alternatively be effected however, by disengaging the restriction valve crank 117 from the corresponding slide rod 41 and holding the restriction valve 35 fully open so that liquid from the cylinder 33 will pass, under pressure due to the loading of the leg, via the restriction valve 35 to the accumulator. Alternatively, again, provision may be made for setting the control valve 34 to open the direct connection 107 to the cylinder 33 above the piston 38.

Figure 13:
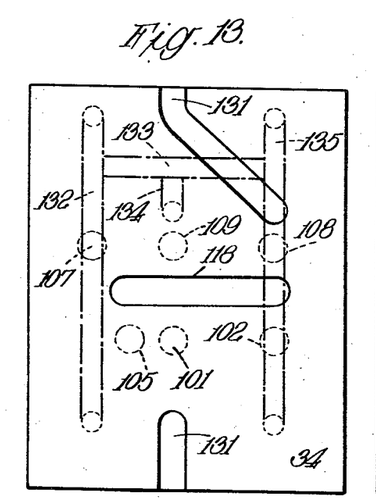

For the position of Fig. 13 all the connections are closed so that the leg will be locked at a given length.

Figure 14:
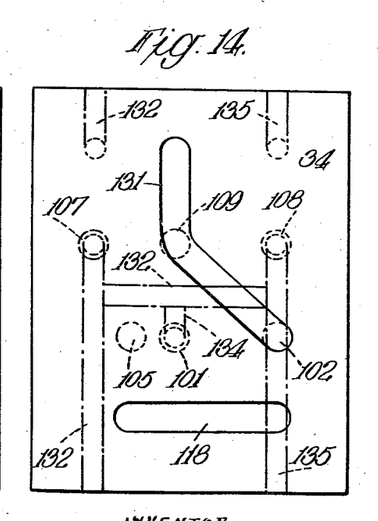

For the Fig. 14 setting pressure fluid from the pump lengthens the leg and this setting is of service for emergency lowering and also, when desired, for raising an airframe in relation to the wheels or floats.

The arrangement illustrated in Figs. 15 to 19 is essentially the same as that of Figs. 10 to 14 but has provision for operation from an open circuit liquid pressure system, e. g., the existing liquid pressure system of an aircraft.

The arrangement of the liquid passages and valve 34 differs somewhat from that of Fig. 10, liquid connections 202 and 203 coaxial with the pivot of the cylinder part 31 connecting, respectively, with the pressure and exhaust sides of the open circuit liquid pressure system. From these connections 202 and 203 liquid passages extend to the chamber of the valve 34 and are indicated at 204 and 205 respectively, a direct passage 206 from the accumulator 32 connecting with the valve chamber via the end portion of the passage 205. This direct passage as well as a connection 207 for introducing air under pressure into the accumulator 32 are controlled by non-return valves 208 and 209 respectively, influenced by a common coil compression spring 210 interposed between them. A further passage 211 from the valve chamber leads to a non-return valve 212 equivalent to the non-return valve 106 of Fig. 10 and to the restriction valve 35 placing the valve chamber in connection with the accumulator 32 via said restriction valve 35 and a further passage 213. Further passages 214 and 215 respectively extend between the valve chamber and the cylinder 33 above the piston 38 and the cylinder 33 below the piston 38 respectively. The passage 205 communicates with the exhaust connection 203 by way of a piston valve 216 influenced by a compression spring 217 to bear on a seating 218 of considerably smaller diameter than the valve 216 the arrangement being such that the liquid pressure acting on the valve within the seating 218 to open it against the pressure of the spring 217 will be considerably greater than the liquid pressure in the cylinder 219, within which the valve 216 is slidable, required to hold the valve open.

In Figs. 16, 17, 18 and 19 of the drawings, the cylindrical surface and grooves in said surface of the valve 34 of Fig. 15 are indicated in full lines, the communicating passages within the body of the valve 34 by chain lines and the ends of the passages opening into the valve chamber by broken lines, as in the case of Figs. 11 to 14.

The settings of the valve 34 of Fig. 15 illustrated in Figs. 16 to 19 have the same effect upon the operation of the leg as the settings of the valve 34 of Fig. 10 illustrated in Figs. 11 to 14 of the drawings. Thus:

In order that pressure in the accumulator 32 may tend to lengthen the leg the valve is set to the position of Fig. 16 in which the passages 214 and 215 from the cylinder 33 above and below the piston 38, respectively, are connected via the groove 220 with the passage 211 leading to the non-return valve 212 and restriction valve 35, the connection 205 leading to the accumulator 32 and to the valve 216 is closed, and the connection 204 from the pressure side of the liquid pressure system, although open to interconnecting passages 221 within the valve body, is in effect closed.

Figure 17:
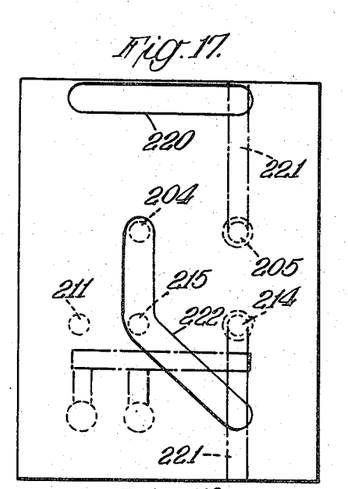

For shortening the leg by liquid pressure from the open circuit liquid pressure system, the valve 34 is set to the position of Fig. 17 so that the pump delivery passage 204 is connected via the groove 222 in the valve surface with the passage 215 leading to below the piston 38, the passage 214 from the cylinder 33 above the piston 38 is connected via the passage 221 with the passage 205 leading to the accumulator 32 and to the valve 216, whilst the passage 211 leading to the non-return valve 212 and restriction valve 35 is closed.

Liquid pressure then raises the piston 38 and liquid from the upper side of the latter passes by way of the valve 34, passages 205 and 206 and non-return valve 208 into the accumulator 32, this valve 208 and the valve 216 being such that the valve 216 will remain closed until the pressure which is built up in the accumulator 32 is sufficient for the purpose of subsequently lengthening the leg for lowering. When this predetermined pressure in the accumulator 32 is attained the pressure acting on the valve 216 within the seating 218 is sufficient to open the valve 216 and once it is opened the pressure in the passages 205 and 206 will fall and the valve 208 will close thus maintaining the pressure in the accumulator 32. Further liquid displaced by the upward movement of the piston 38 passes directly to the exhaust by the connection 203.

Figure 18:
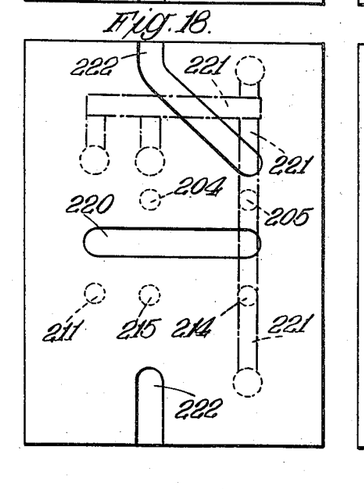

When desired, for example when the leg is in the retracted position, the valve may be set to the position of Fig. 18 in which all the passages are closed.

Figure 19:
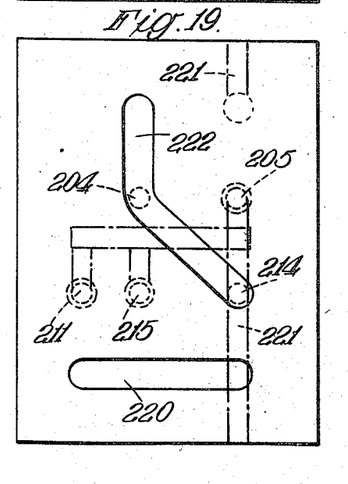

For lengthening the leg by pressure from the hydraulic system, the valve 34 is set to the position of Fig. 19 thus connecting the passage 204 via the valve groove 222 with the passage 214 leading to the upper side of the piston 38 and connecting also via the valve passages 221 the passage 215 from the lower side of the piston 38 with the passage 205 leading to the accumulator 32 and to the exhaust, and incidentally with the passage 211 leading to the non-return valve 212 and restriction valve 35.

It will be realised that apart from the fact that provision is made for operation from closed or open fluid pressure circuits the arrangements of Figs. 10 and 15 are essentially the same.

Figure 21:
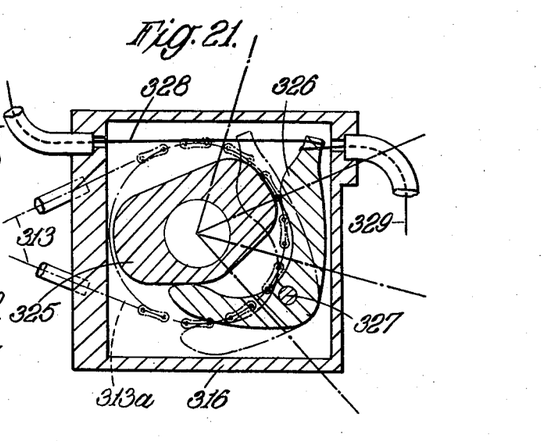
Fig. 21 is a cross-section on the line 21—21 of Fig. 20 and illustrating together therewith means for setting or controlling the radius member catch device (Figs. 3 to 9) and a catch for holding the leg in the retracted position.
Figure 22:
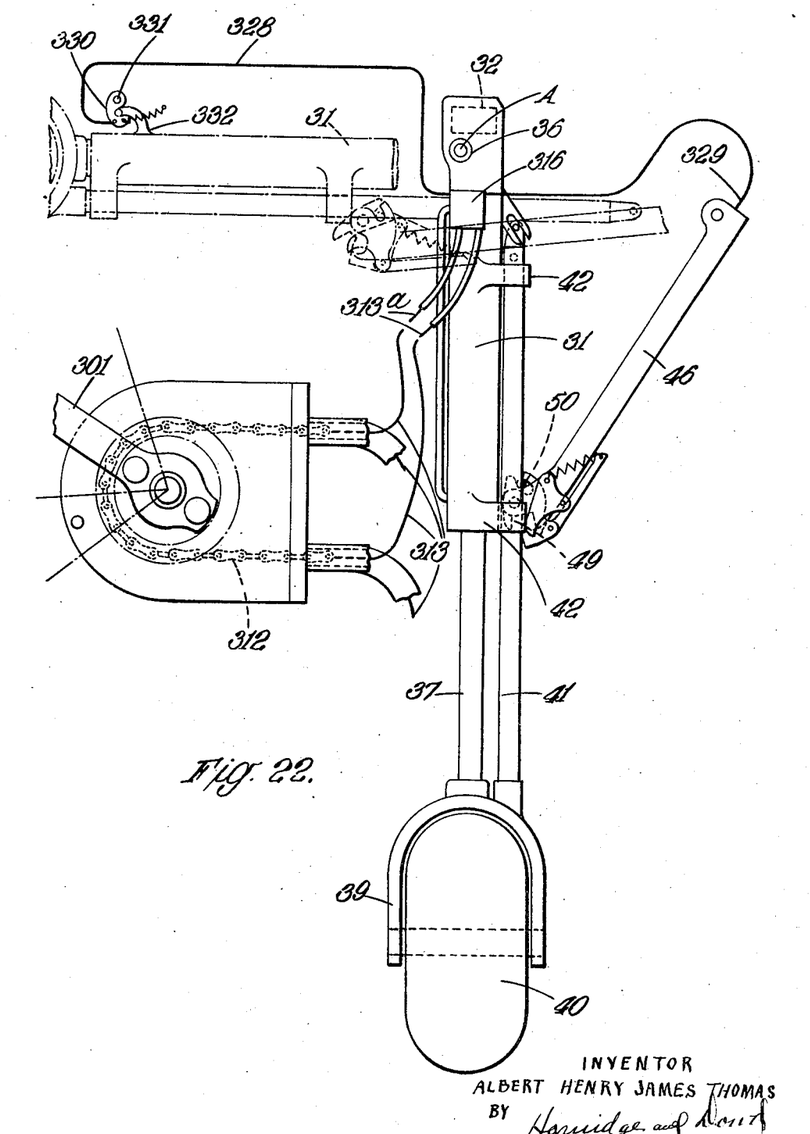
Fig. 22 is a diagram drawn to the smaller scale showing in elevation a pilot's control lever and the connections thereof with the control valve and the radius member catch and the holding catch, Fig. 23 showing the control lever in plan and Fig. 24 being a face view of a "gate" associated with the control lever.
Figure 23:
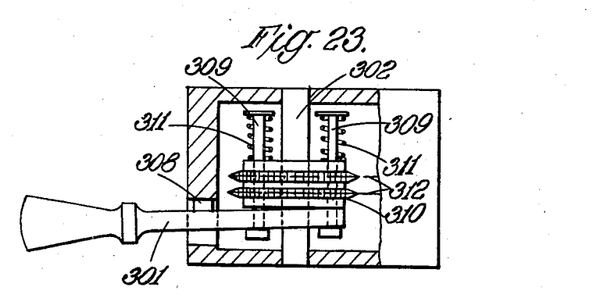
Figure 24:
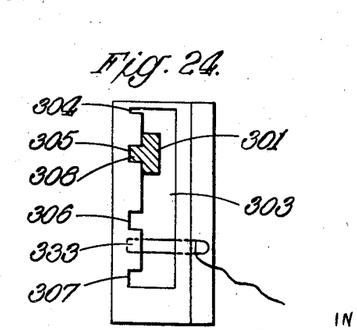

In all arrangements according to the invention there are three components requiring to be controlled, for example by the pilot of an aircraft; namely, the catch device or other means whereby the necessary connection of the radius member to the cylinder part or to the moving part of the telescopic leg are effected, the control valve, and the holding catch mentioned above for retaining the leg in the retracted position. It will be apparent that these may be controlled in various ways without departing from the spirit of the invention. However, it will in general be desirable that all these three components should be controlled from a single control member easily accessible to the pilot. Such a control arrangement is illustrated in Figs. 21 to 23 of the drawings. In this arrangement a main control lever 301 is mounted for angular movement about a spindle 302 within a gate 303 (Fig. 23). This gate having side notches 304, 305, 306 and 307 which in practice might be marked, respectively, "retract," "neutral," "lower" and "emergency lower," and which correspond to the valve positions shown, respectively, in Figs. 12, 13, 11 and 14 in the case of the Fig. 10 arrangement and to the valve positions shown in Figs. 17, 18, 16 and 19 in the case of the Fig. 15 arrangement.

Figure 20:
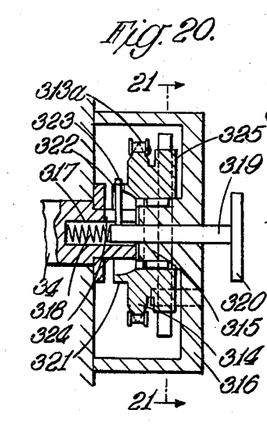
Fig. 20 is an enlarged sectional view of a detail of Figs. 10 and 15.

The lever 301 has a lateral projection 308 for engagement with the notches 304 to 307 of the gate 303 and is loose on the spindle 302, headed pins 309 extending through the lever and through a sprocket 310 fast on the spindle 302 carrying coiled compression springs 311 holding the lever 301 at all times against that side of the gate 303 in which the notches 304 to 307 are formed. The sprocket 310 is a double one and has extending therearound two lengths of sprocket chain 312 Fig. 22 the ends of which are secured to Bowden wires 313 of which those of one chain 312 lead to one telescopic leg and those of the other chain 312 lead to the other telescopic leg of a pair, it being assumed that the control system under discussion is for an aircraft having a pair of telescopic legs according to the invention. At those ends remote from the control lever 301 each pair of Bowden cables 313 is connected with the ends of a second length of chain 313a passing around a sprocket 314 journalled on a boss 315 in a box 316 (see Figs. 20 and 21) secured to the side of the cylinder part 31 of the leg coaxially of the control valve 34. The valve 34 projects into the interior of this box 316 and is formed from its outer end with an axial bore 317 containing a coiled compression spring 318 which bears against the end of a stem 319 which is slidable and rotatable in a bore in the boss 315, a hand wheel 320 being provided for shifting this stem 319 by hand. At that face nearer the leg a flange 321 of the sprocket 314 is formed with a notch 322 into which projects a pin 323 extending rigidly from the near end of the stem 319, the end portion of the valve 34 being formed with a longitudinal slot 324 to accommodate the pin 323 so that whenever the stem 319 is rotated the valve 34 will be rotated with it.

Normally the parts occupy the positions shown so that when the sprocket 314 is rotated by movement of the control lever 301 the stem 319 and therefore the valve 34 will be rotated with it. When, however, it is desired to shift the valve 34 independently of the control lever 301 the stem 319 is shifted inwardly by pressure on the hand wheel and rotated as required by means of the latter. This independent shifting of the control valve 34 will be of service in cases where it is desired to raise or lower the airframe in relation to the wheels or floats which will be useful for purposes of storage where head room is limited as in the case of an aircraft carrier.

In order that the radius member catch and the holding catch may be operated by the control lever 301 during normal lowering and retraction operation of the leg members there is formed integrally with the sprocket 314 of each leg a cam 325 (see particularly Fig. 21). This cam 325 cooperates with a rocker 326 fulcrumed at 327 in the box 316, one end of which rocker 326 is connected with Bowden wires 328 and 329 leading, respectively, to the holding catch and to the radius member catch. The holding catch comprises simply a catch member 330 fulcrumed at 331 upon the airframe and which is spring-influenced to tend always to engage beneath an L-shaped hasp 332 on the cylinder part of the leg.

Figure 16:
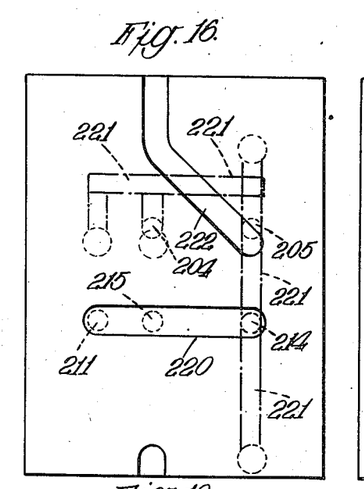

When the leg is in the lowered position the valve 34 will occupy the position of Fig. 11, or 16, and the cam 325, and therefore the rocker 326, will occupy the positions shown in full lines in Fig. 21 that is pulling the Bowden wire 328 and slackening the Bowden wire 329 and so maintaining the holding catch 330 in the released position and allowing the springs of the radius member catch device to hold the latter connected to the cylinder part 31 of the leg. When, in order to effect retraction, the valve 34 is turned to the position of Fig. 12 or Fig. 17 by shifting the control lever 301 to the notch 304 of the gate 303 the Bowden wire 329 of the radius member catch will be pulled to bring the latch member 54 to the position shown in Fig. 4 and to allow the holding catch 330 to assume the holding position under its spring-influence. These positions of the cam 325 and rocker 326 are shown in broken lines in Fig. 21. As the leg arrives in the retracted position the hasp member 332 thereof coming to bear upon the inclined lower face of the holding catch 330 will shift it about its pivot 331 against the spring-influence until the leg is fully retracted when the catch 330 will be moved by the spring-influence to the position shown in dotted lines to engage beneath the latch member 332 and hold the leg retracted. The pilot may then shift the control lever to the "neutral" position (notch 305). In a modification, simple pull wires (not shown) may be provided whereby the holding catches 330 may be released at will, when, the valve 34 having been left in the normal lower position, the legs will automatically perform the lowering operation under the influence of pressure stored in the accumulators, so long as these latter are not damaged.

As will be seen in the arrangement illustrated, setting the control lever 301 to the "lower" position will pull the wire 328 and slacken the wire 329, thus releasing the holding catch 330 and freeing the latch member 54 for connecting the radius member 46 once again with the cylinder part 31 as the lowering operation terminates. The cam 325 and rocker 326 are so shaped that the additional movement imparted to the former by further rotation of the valve 34 consequent upon movement of the lever 301 to the "emergency lower" position will not impart further movement to the rocker 326 but will simply hold it in position at which it was brought by setting of the lever 301 to the "lower" position.

In order to provide evidence that "emergency lowering" has been effected a pin 333 is normally secured in position across the gate 303 between the "lower" and "emergency lower" notches 306 and 307 by such means as a lead seal which must be broken by the removal of the pin 333 to enable the lever 301 to be shifted to the "emergency lower" position.

The shortening of an undercarriage leg according to the invention to effect retraction has the advantage of economising space. Further, whilst retaining the properties of normal oleo-pneumatic shock absorption the damping of wheel movements by the hydraulic means, including the restriction valve and air accumulator, will it is anticipated be advantageous, even if only because of the variation in hydraulic control of the wheel movement which is readily possible.

It is to be noted that when an aeroplane having undercarriage legs, as described above, lands, the wheel movements will first be controlled by the restriction valve and by the lower pressure air in the accumulator, and subsequently, as more of the weight of the aircraft is transferred to the wheels, by the high pressure air in the high pressure air cylinder as well. The control of the wheel movements may be regarded as having two phases which so to speak merge into one another according to the wheel loading or the shock forces acting thereon at any part of the inward stroke of the ram.

Clearly, the axes of the leg pivots may be disposed longitudinally or transversely of an aircraft, or in some intermediate position.

Undercarriage legs according to the invention may be of service for raising and lowering an airframe in relation to landing wheels or floats which may be of great importance for storage where head room is limited.

Finally, the use of undercarriage legs in accordance with the invention in no way precludes or interferes with the provision of means already known in undercarriages such for example as wheel braking systems for steering when taxiing, or castoring wheels enabling an aircraft to be landed across wind with the wheels in the direction of flight or landing and the head of the craft into the wind.

What I claim is:

1. In an aircraft having an airframe, an undercarriage leg, comprising in combination a telescopic member pivotally anchored at one of its two relatively slidable parts to the airframe, a radius member pivotally attached at one end to said airframe about an axis spaced from and parallel with that of the pivotal anchorage of the telescopic member to said airframe, and catch means whereby the other end of the radius member is connected with the pivotally anchored part of the telescopic member when the leg is in the lowered position and at other times with the other relatively slidable part of the telescopic member, said catch means comprising a lug on said other end of the radius member having oppositely directed notches, adapted to receive transverse projections carried by the pivotally anchored part of the telescopic member and by the moving part of the telescopic member, respectively, hydraulic means being provided for moving the movable part of the telescopic member relatively to the pivoted part.

2. In an aircraft having an airframe, an undercarriage leg comprising in combination a telescopic member composed of two relatively slidable parts one of which is anchored at one end to the airframe, a radius member pivotally attached at one end to said airframe about an axis spaced from and parallel with that of the pivotal anchorage of the telescopic member to said airframe, and a catch mounted on the other end of said radius member adapted to engage selectively projections carried respectively by the pivotally anchored part of the telescopic member and by the other relatively slidable part of said telescopic member whereby said radius member is connected with the pivotaly anchored part of the telescopic member when the leg is in the lowered position and at other times with the other relatively slidable part of said telescopic member.

3. An undercarriage leg as claimed in claim 2, the said telescopic member having oleo-pneumatic means for damping motion of the said slidable member relative to said pivotally anchored part, comprising a piston carried by the relatively slidable part movable within a cylinder located within the pivotally anchored part against a body of air pressed liquid, a supplemental cylinder located within said relatively slidable part of said telescopic member, a piston located therein, a volume of compressed air of higher pressure than that in said first mentioned cylinder on one side of said piston and a restricted communication from said first mentioned cylinder to the cylinder located within said slidable member on the oppoiste side of said last mentioned piston.

4. In an aircraft having an airframe, an undercarriage leg, comprising in combination a telescopic member pivotally anchored at one of its two relatively slidable parts to the airframe, a radius member pivotally attached at one of its ends to said airframe about an axis spaced from and parallel with that of the pivotal anchorage of the telescopic member to said airframe, and catch means mounted on the other end of said radius member adapted to connect said radius member with the pivotally anchored part of the telescopic member when said telescopic member is extended and at other times with the other relatively slidable part of said telescopic member, said catch means comprising a lug on said other end of the radius member having oppositely directed notches adapted to receive transverse projections carried by the pivotally anchored part of the telescopic member and by the other relatively slidable part thereof, respectively, a substantially E-shaped latch member pivoted about the end of its center limb on the lug at a point between said notches for angular movement in one direction to a position in which one outer limb thereof extends across one notch to retain the corresponding transverse projection therein and the other limb is withdrawn clear of the other notch and for angular movement in the opposite direction to close said other notch and open the first mentioned notch.

5. An undercarriage leg as claimed in claim 4, the latch member being spring-influenced to tend always to assume a position in which it closes one of the two notches in the lug, and a detent carried by said latch member for holding the latch member against the spring-influence in position to close the other notch of the lug.

6. An undercarriage leg as claimed in claim 4 having a detent pivotally mounted on the latch member and a rocker pivotally mounted on said radius member and connected by a spring to said detent to hold said detent in engagement with said rocker, cam means carried by the pivotally anchored part of the telescopic member cooperating with said rocker and one of said outer limbs of said latch member to shift the detent between positions where said detent is operative and inoperative respectively.

7. An undercarriage leg as claimed in claim 4, said latch member having a spring connecting it to a detent pivotally mounted at one end on said latch member, extending longitudinally of the radius member and provided with an undercut nib at its other end adapted to engage an undercut lip on said radius member, a rocker pivotally mounted at one end on said lug and bearing against said detent, a cam comprising said transverse projection carried by the pivotally anchored part of the telescopic member cooperating with said rocker selectively to hold said detent out of operative position and allow it to assume its operative position under the influence of said spring, respectively, the said latch member and rocker being so positioned relative to each other that as the telescopic leg traverses positions close to the fully lowered position they are engaged by said cam to move the detent under the influence of said spring first inwardly towards the radius member to operative position and then longitudinally of the radius member to engage the undercut nib with the undercut lip on said member as retraction commences and against the influence of the spring, first longitudinally of the radius member to clear said nib from said lip and then outwardly away from the radius member out of operative position, as lowering terminates.

8. An undercarriage leg as claimed in claim 2, the pivotally anchored part of the telescopic member comprising a cylinder and the other relatively slidable part carrying a piston mounted on the end of a ram slidable within said cylinder, an air accumulator for pressure liquid communicating with said cylinder, adapted to receive oil forced by the movement of said piston into said accumulator against the pressure of the air in said accumulator.

9. An undercarriage leg as claimed in claim 2, the pivotally anchored part of the telescopic member comprising a cylinder and the other relatively slidable part carrying a piston slidable within said cylinder, an air accumulator for pressure liquid communicating with said cylinder adapted to receive the liquid displaced by movement of the piston under progressively increasing pressure.

10. An undercarriage leg as claimed in claim 2, the pivotally anchored part of the telescopic member comprising a cylinder and the other relatively slidable part carrying a piston mounted on a ram both slidable in said cylinder, an air accumulator for pressure liquid communicating with said cylinder on both sides of said piston, a volume of liquid filling said cylinder and a portion of said accumulator, whereby the liquid displaced by shortening of the telescopic member and inward movement of said piston and ram, due to consequent reduction of liquid space within the cylinder by the entry of the ram, passes to said accumulator under progressively increasing pressure.

11. An undercarriage leg as claimed in claim 2, the pivotally anchored part of the telescopic member comprising a cylinder and the other relatively slidable part carrying a piston slidable within said cylinder, an air accumulator for pressure liquid, a valve controlling passages for pressure liquid, said control valve having connections to the delivery end of a boost pump, to the cylinder at both sides of said piston and to said air accumulator and means for adjusting said control valve to a series of positions in one of which it connects the air accumulator with the cylinder at both sides of said piston and shuts off the pump connection, and in another of which positions it connects the delivery end of the pump with the cylinder at one side of the piston and connects the cylinder at the other side of said piston with the accumulator.

12. An undercarriage leg as claimed in claim 2, the pivotally anchored part of the telescopic member comprising a cylinder and the other relatively slidable part carrying a piston slidable within said cylinder, an air accumulator for pressure liquid, a valve controlling passages for pressure liquid, said control valve having connections to the delivery end of a boost pump, to the cylinder at both sides of said piston and to said air accumulator, and means for adjusting said control valve to a series of positions in one of which it connects the air accumulator with the cylinder at both sides of said piston and shuts off the pump connection, in another of which positions it connects the delivery end of the pump with the cylinder at one side of the piston and connects the cylinder at the other side of said piston with the accumulator, and in a third of which positions it connects the cylinder at said one side of said piston with the accumulator and connects the cylinder at said other side of said piston with the delivery end of said boost pump.

13. An undercarriage leg as claimed in claim 2, the pivotally anchored part of the telescopic member comprising a cylinder and the other relatively slidable part carrying a piston slidable within said cylinder, an air accumulator for pressure liquid, a valve controlling passages for said pressure liquid, said valve having connections to the delivery end of a boost pump, to the cylinder at both sides of said piston and to said air accumulator, and means for adjusting said control valve to each of four positions, in the first of which it connects the air accumulator with the cylinder at both sides of said piston and shuts off the pump connection, in the second of which it connects the delivery end of the pump with the cylinder at one side of said piston and connects the cylinder at the other side of said piston with the accumulator, in the third of which it connects the cylinder at said one side of said piston with the accumulator and connects the cylinder at said other side of said piston with the delivery end of said boost pump, and in the fourth of which all the passages controlled by said valve are shut off.

14. An undercarriage leg as claimed in claim 2, the pivotally anchored part of the telescopic member comprising a cylinder, and the other relatively slidable part carrying a piston slidable within said cylinder, an air accumulator for pressure liquid, a valve controlling passages for pressure liquid, a boost pump the delivery and return ends of which are connected to said control valve, said control valve being connected to said cylinder at both sides of said piston and to the air accumulator, means for adjusting said control valve to a series of positions in one of which it connects the air accumulator with the cylinder at both sides of said piston and shuts off the pump connection, and in another of which positions it connects the delivery end of the pump with the cylinder at one side of the piston and connects the cylinder at the other side of said piston with the accumulator, said valve being adapted, when in position to connect the cylinder at either side of the piston with the accumulator, to connect also therewith the return end of the pump.

15. An undercarriage leg as claimed in claim 2, the pivotally anchored part of the telescopic member comprising a cylinder and the other relatively slidable part carrying a piston slidable within said cylinder, an air accumulator for pressure liquid, a valve controlling passages for said pressure liquid, said valve having connections to the delivery end of a boost pump, to the cylinder above said piston, to the cylinder below said piston and to the air accumulator, means for adjusting said control valve to a series of positions, in one of which it connects the air accumulator with the cylinder above and below said piston and shuts off the pump connection, and in another of which positions it connects the delivery end of the pump to the cylinder below the piston and connects the cylinder above the piston with the accumulator, and a by-pass valve adjustable to by-pass the pressure liquid above the piston when it has reached a pressure in excess of a predetermined pressure in the air accumulator.

16. An undercarriage leg as claimed in claim 2, the pivotally anchored part of the telescopic member comprising a cylinder and the other relatively slidable part carrying a piston slidable within said cylinder, an air accumulator for pressure liquid in communication with said cylinder, whereby liquid displaced by inward movement of said other relatively slidable part and piston due to consequent reduction of liquid space within the cylinder passes to said accumulator and builds up pressure therein, the communication to the air accumulator from the cylinder being provided with a restriction whilst the communication from one side of the piston to the other is relatively unrestricted.

17. An undercarriage leg as claimed in claim 2, the pivotally anchored part of the telescopic member comprising a cylinder and the other relatively slidable part carrying a piston slidable within said cylinder, an air accumulator for pressure liquid in communication with said cylinder whereby liquid displaced by inward movement of said other relatively slidable part and piston due to consequent reduction of liquid space within the cylinder passes to said accumulator and builds up pressure therein, the communication to the air accumulator from the cylinder having therein a restriction valve with means for progressively controlling the size of the communication therethrough operated by a pivoted arm so positioned as to be engaged by a projection carried by said other relatively slidable part as the latter moves to and from its retracted position thereby to progressively close and open said restriction valve respectively.

18. An undercarriage leg as claimed in claim 2, the pivotally anchored part of the telescopic member comprising a cylinder and the other relatively slidable part carrying a piston slidable within said cylinder, an air accumulator for pressure liquid in communication with said cylinder whereby liquid displaced by inward movement of said other relatively slidable part and piston due to consequent reduction of liquid space within the cylinder passes to said accumulator and builds up pressure therein, the communication to the air accumulator from the cylinder having therein a restriction, and a non-return valve in said communication by-passing said restriction to allow the free passage of said liquid from the accumulator to the cylinder.

19. For an aircraft, an undercarriage leg, comprising a telescopic member mounted at one end of the two relatively sliding parts thereof for pivotal retracting and lowering movement, a rigid stay member connected with said pivotally mounted part when the leg is in the lowered position, means for positively moving the other part of the telescopic member relative to the pivoted part when the leg is in lowered position, the said telescopic member having oleo-pneumatic means for damping motion of said other part of said telescopic member relative to the pivotally mounted part comprising a piston carried by said other part of said telescopic member movable within a cylinder located within said pivotally mounted part against a body of air pressed liquid and a supplemental cylinder located within said other part, a piston located therein, a volume of compressed air of higher pressure than that in said first mentioned cylinder, on one side of said piston and a restricted communication from said first mentioned cylinder to the cylinder located within said other part on the opposite side of said last mentioned piston.

20. In an aircraft having an airframe, an undercarriage leg comprising in conjunction a telescopic member composed of two relatively slidable parts one of which is pivotally anchored at one end to the airframe, a rigid radius member pivotally attached at one end to said airframe about an axis spaced from and parallel with that of the pivotal anchorage of the telescopic member to said airframe, catch means carried by the other end of said radius member and adapted alternately to engage the pivotally anchored part and the other relatively slidable part of the telescopic member, and means for selectively bringing about engagement of said catch means with said pivotally anchored part to support the leg in the lowered position and with the other relatively slidable part to bring about retracting or lowering of the leg upon shortening or lengthening respectively of the telescopic member.

21. An undercarriage leg as claimed in claim 20, wherein for effecting telescopic movement of the telescopic member, means are provided for applying boost pressure from an external source to a piston carried by the one part and slidable within a cylinder comprised by the other relatively slidable part of the telescopic member.

22. In an aircraft, the combination claimed in claim 20 and hydraulic means for moving the other relatively slidable part relatively to the pivotally anchored part of the telescopic member when the leg is in the lowered position.

ALBERT HENRY JAMES THOMAS.